United States Patent
Yau

(10) Patent No.: US 10,292,239 B2
(45) Date of Patent: May 14, 2019

(54) ILLUMINATION POWER SAVING METHOD

(71) Applicant: Delight Innovative Technologies Limited, Admiralty, Hong Kong (CN)

(72) Inventor: Kinhing Yau, Hong Kong (CN)

(73) Assignee: Delight Innovative Technologies Limited, Hong Kong (CN)

(*) Notice: Subject to any disclaimer, the term of this patent is extended or adjusted under 35 U.S.C. 154(b) by 85 days.

(21) Appl. No.: 15/522,618

(22) PCT Filed: Oct. 30, 2015

(86) PCT No.: PCT/CN2015/093424
§ 371 (c)(1),
(2) Date: Apr. 27, 2017

(87) PCT Pub. No.: WO2016/066137
PCT Pub. Date: May 6, 2016

(65) Prior Publication Data
US 2018/0279447 A1 Sep. 27, 2018

(30) Foreign Application Priority Data

Oct. 30, 2014 (CN) .......................... 2014 1 0596704

(51) Int. Cl.
*H05B 37/02* (2006.01)
*H05B 41/02* (2006.01)
*F21Y 115/10* (2016.01)

(52) U.S. Cl.
CPC ......... *H05B 37/0218* (2013.01); *H05B 37/02* (2013.01); *H05B 41/02* (2013.01);
(Continued)

(58) Field of Classification Search
None
See application file for complete search history.

(56) References Cited

U.S. PATENT DOCUMENTS

| 8,299,722 B2 | 10/2012 | Melanson |
| 2010/0148677 A1* | 6/2010 | Melanson .......... H05B 33/0869 315/154 |

FOREIGN PATENT DOCUMENTS

| CN | 201910957 U | 7/2011 |
| CN | 102246596 A | 11/2011 |

(Continued)

OTHER PUBLICATIONS

International Search Report (and its English translation) for PCT Application No. PCT/CN2015/093424 filed Oct. 30, 2015 (published as WO 2016/066137 dated May 6, 2016) which is the parent application to the instant application, 5 pages.

*Primary Examiner* — Dedei K Hammond
(74) *Attorney, Agent, or Firm* — Harness, Dickey & Pierce, P.L.C.; Anthony G. Fussner

(57) ABSTRACT

A lighting energy saving method of the present invention, comprises a plurality of brightness adjustable illuminants, and a plurality of photoreceptors for detecting brightness of lighting environment, the brightness of lighting environment is brightness of the environment formed by illumination light emitted from all the illuminants, natural light and illumination light emitted from other lighting systems, wherein comprising: A. setting basic illumination brightness of the lighting environment, i.e. setting basic photosensitivity value of each of the photoreceptors; B. adjusting illumination brightness of each illuminant to a corresponding brightness value to obtain a real-time brightness environment of the lighting environment, and then detecting the real-time brightness environment by the photoreceptors to obtain the photosensitivity values detected by the photoreceptors, the photosensitivity values reflecting the real-time illumination brightness of the real-time brightness environment; C. comparing the detected photosensitivity values actually detected by all the photoreceptors to their own basic (Continued)

photosensitivity values, determining whether their own basic photosensitivity values are satisfied, if not, repeating B, if so, entering D; D. all the illuminants lighting according to the brightness that they should have at the real-time brightness environment.

11 Claims, 9 Drawing Sheets

(52) U.S. Cl.
CPC ........... *F21Y 2115/10* (2016.08); *Y02B 20/40* (2013.01); *Y02B 20/46* (2013.01)

(56) References Cited

FOREIGN PATENT DOCUMENTS

| | | |
|---|---|---|
| CN | 103607832 A | 2/2014 |
| JP | 3932966 B2 | 6/2007 |

* cited by examiner

ILLUMINATION POWER SAVING METHOD

This patent application is a U.S. national stage filing under 35 U.S.C. § 371 of International Application No. PCT/CN2015/093424 filed Oct. 30, 2015, which claims priority of Chinese Application No. 201410596704.x filed Oct. 30, 2014. The disclosures of the applications identified in this paragraph are incorporated herein by reference in their entirety.

TECHNICAL FIELD

The present invention relates to an energy saving method, and more particularly to a lighting energy saving method for lighting system.

BACKGROUND OF THE INVENTION

In the prior art, there has been a method for automatically adjusting the brightness of a single lamp according to the light intensity to realize the energy saving of the single lamp. For example, the technical solution disclosed in Patent Application CN200710053895.5 comprises sensing the light intensity by a photosensitive sensor, feeding back the light intensity to a circuit, and automatically adjusting, by the circuit, the brightness of the lamp according to the light intensity. However, for a lighting system with a large number of lights, in addition to the use of more energy-efficient lights and lamps and turning off the lights in some areas which do not need lighting, there is no more effective lighting energy saving method for the entire lighting system.

BRIEF SUMMARY OF THE INVENTION

The present invention solves the technical problem that the prior art can not carry on the lighting energy saving to the entire lighting system in the luminous environment, and provides a lighting energy saving method by adjusting the brightness of the illuminants in the lighting system according to the brightness required by the lighting environment, so as to realize the lighting energy saving of the entire lighting system. The present invention is achieved as follows:

A lighting energy saving method for energy saving of a lighting system, the lighting system comprises a plurality of brightness adjustable illuminants, and a plurality of photoreceptors for detecting brightness of lighting environment, the brightness of lighting environment is brightness of the environment formed by illumination light emitted from all the illuminants, natural light and illumination light emitted from other lighting systems, wherein comprising: A. setting basic illumination brightness of the lighting environment, i.e. setting basic photosensitivity value of each of the photoreceptors; B. adjusting illumination brightness of each illuminant to a corresponding brightness value to obtain a real-time brightness environment of the lighting environment, and then detecting the real-time brightness environment by the photoreceptors to obtain the photosensitivity values detected by the photoreceptors, the photosensitivity values reflecting the real-time illumination brightness of the real-time brightness environment; C. comparing the detected photosensitivity values actually detected by all the photoreceptors to their own basic photosensitivity values, determining whether their own basic photosensitivity values are satisfied, if not, repeating B, if so, entering D; D. all the illuminants lighting according to the brightness that they should have at the real-time brightness environment.

It further comprises E: setting a detection frequency, detecting, by the photoreceptors, the real-time brightness environment at regular intervals according to the detection frequency to obtain the detected photosensitivity values of the photoreceptors, and then repeating C.

The basic photosensitivity values are satisfied means that the photosensitivity value of a photoreceptor reaches or exceeds its basic photosensitivity value, and the adjusting illumination brightness of each illuminant in B means that the illuminants are adjusted synchronously by a certain brightness value until at least one of the photoreceptors satisfies its basic photosensitivity value.

If at least one of the photoreceptors satisfies its basic photosensitivity value, the illuminants return to the brightness which is the previous brightness before the last adjustment of the brightness value, and then the adjusting illumination brightness of each illuminant in B further means adjusting the brightness of individual illuminants one by one.

The adjusting the brightness of individual illuminants one by one means increasing or decreasing the brightness of individual illuminants one by one, the increasing means increasing the brightness from low to high, and the decreasing means decreasing the brightness which has been increased in advance to the maximum brightness value;

the increasing the brightness of individual illuminants one by one means increasing a certain brightness value of a certain illuminant, wherein, if in C, the reading numbers of the photoreceptors are still smaller than the basic photosensitivity values after the brightness of the certain illuminant is increased by the certain brightness value, the brightness of the illuminant is retained, and the next illuminant will be subject to the process of increasing the brightness value; if the photosensitivity value of at least one of the photoreceptors is greater than the basic photosensitivity value, the illuminant returns to the previous brightness and the next illuminant will be subject to the process of increasing brightness, and when increasing the brightness of the next illuminant by the brightness value, the photoreceptor of which the photosensitivity value has been greater than the basic photosensitivity value will not participate the brightness detection; if the photosensitivity values of the photoreceptors satisfy the basic photosensitivity value, the illuminants will be lighting at the real-time brightness environment;

the decreasing the brightness of individual illuminants one by one means decreasing a certain brightness value of a certain illuminant, wherein, if in C, the reading numbers of the photoreceptors are still greater than the basic photosensitivity values after the brightness of the certain illuminant is decreased by the certain brightness value, the brightness of the illuminant is retained, and the next illuminant will be subject to the process of decreasing the brightness value; if the photosensitivity value of at least one of the photoreceptors is less than the basic photosensitivity value, the illuminant returns to the previous brightness and the next illuminant will be subject to the process of decreasing brightness, if the photosensitivity values of the photoreceptors are equal to the basic photosensitivity values, the illuminants will be lighting at the real-time brightness environment.

The adjusting the brightness of individual illuminants one by one means increasing or decreasing the brightness of individual illuminants one by one, the increasing means increasing the brightness from low to high, and the decreasing means decreasing the brightness which has been increased in advance to the maximum brightness value;

the increasing the brightness of individual illuminants one by one means B1: increasing the brightness of a certain illuminant by brightness values step by step, and returning the illuminant to the brightness which is the previous brightness before the last increasing of the brightness value if the reading number of at least one of the photoreceptors is greater than the basic photosensitivity value when the brightness of the illuminant is increased by a certain brightness value, B2: performing the process of B1 on the next illuminant and performing the process on all the illuminants, after that and when performing the process of increasing the brightness by the brightness value on the next illuminant, the photoreceptor of which the photosensitivity value has been greater than the basic photosensitivity value will not participate the brightness detection;

the decreasing the brightness of individual illuminants one by one means B1: decreasing the brightness of a certain illuminant by brightness values step by step, and returning the illuminant to the brightness which is the previous brightness before the last decreasing of the brightness value, if the reading number of at least one of the photoreceptors will be less than the basic photosensitivity value when the brightness of the illuminant is decreased by a certain brightness value, B2: performing the process of B1 on the next illuminant and performing the process on all the illuminants.

The certain brightness value means a brightness of 0.5 degree or 1 degree or 2 degree, or 1%, 5%, 10% or 20% of the maximum brightness value.

The adjustment synchronously means increasing or decreasing one brightness value at a time; or increasing or decreasing by one brightness value many times, the brightness value is 1 degree to 3 degree, or 1%, 5%, 10% or 20% of the maximum brightness value.

The adjusting the lighting brightness of the illuminants in B further means increasing the brightness of one of random two illuminants and decreasing the brightness of the other of the random two illuminants by the same or different brightness values.

The brightness value is 1 degree, 2 degree or 3 degree, or 1%, 3%, 5% or 10% of the maximum brightness value.

The adjusting the lighting brightness of the illuminants in B means decreasing or increasing the brightness of the individual illuminants one by one.

The adjusting the lighting brightness of the illuminants in B means increasing the brightness of one of random two illuminants and decreasing the brightness of the other of the random two illuminants by the same or different brightness values.

The detection frequency is 5-300 minutes.

The adjustment of increasing the brightness of one illuminant and decreasing the brightness of the other illuminant is an adjustment that is automatically performed at a set interval.

Technology Effect

According to the present invention, by continuously adjusting the lighting brightness of each illuminant in the luminous environment until the detected photosensitivity value actually detected by all the photoreceptors satisfies their respective basic photosensitivity values, it is ensured that all the illuminants are lighting in the state of satisfying the basic illumination brightness, which can maximize the savings in lighting power consumption.

By setting the detection frequency, when the environmental conditions are changed and the detected photosensitivity value does not coincide with the basic photosensitivity value, the real-time brightness environment can be periodically detected by the photoreceptors in accordance with the detection frequency so as to re-adjust the most energy-efficient lighting brightness of each illuminant.

By using the method of synchronously increasing or decreasing the brightness of illuminants, it is possible to quickly reach the brightness value of the illuminant close to the basic illumination brightness. Further by decreasing or increasing the brightness of individual illuminants one by one, and even by increasing the brightness of one of any two illuminants and decreasing the brightness of the other of the any two illuminants by the same or different brightness values, it is possible to ensure that the illuminants reach the set basic illumination brightness with the most energy-efficient brightness value.

DETAILED DESCRIPTION OF THE INVENTION

The invention will now be described in further detail with reference to the accompanying drawings.

Figure 1:
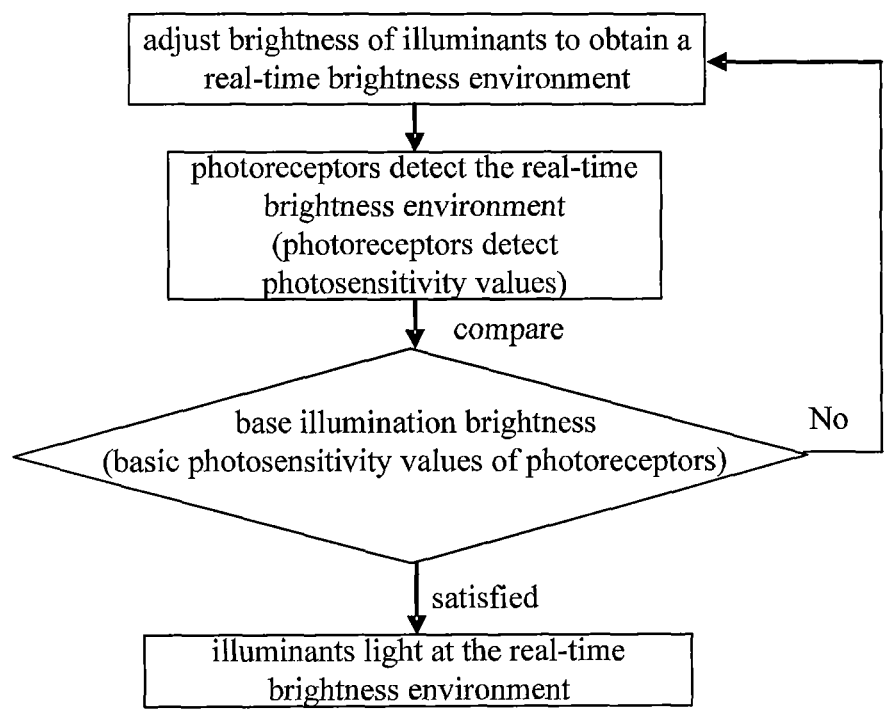
FIG. 1 is a basic flow chart of a lighting energy saving method of the present invention.

A lighting energy saving method for energy saving of a lighting system according to the present invention is provided. The lighting system comprises a plurality of brightness adjustable, especially brightness continuously adjustable illuminants, and a plurality of photoreceptors for detecting the brightness of the lighting environment. The photoreceptors may be provided at positions adjacent to the illuminants, or may be provided in an environment where the illuminants can illuminate, such as a desk, a wall surface, etc. The photoreceptors may be TOPCON BM-7, BM-5A, BM-9, SR-3A illuminometers. The illuminants may be LED lamps or other brightness adjustable or continuously adjustable illuminants, including fluorescent lamps, incandescent lamps or the like to which a brightness adjusting device is mounted. The energy saving method comprises following steps: A. setting basic illumination brightness of the lighting environment, that is, setting the basic photosensitivity value of each photoreceptor, wherein, the brightness of the lighting environment is brightness of the environment formed by illumination light emitted from all the illuminants, natural light and illumination light emitted from other lighting system; B. adjusting illumination brightness of each illuminant to a corresponding brightness value to obtain a real-time brightness environment of the lighting environment, and then detecting the real-time brightness environment by the photoreceptors to obtain the photosensitivity values detected by the photoreceptors, the photosensitivity values reflecting the real-time illumination brightness of the real-time brightness environment; referring to FIG. 1: C. comparing the detected photosensitivity values actually detected by all the photoreceptors to their own basic photosensitivity values, determining whether their own basic photosensitivity values are satisfied, that is, whether their own basic photosensitivity value is reached or exceeded, if not, repeating B, if so, entering D; D. all the illuminants lighting according to the brightness that they should have at the real-time brightness environment. Here, in step C, the basic photosensitivity values being satisfied may mean that the photosensitivity values are the same within a certain error range.

After above steps, the method further comprises step E: setting a detection frequency, detecting, by the photoreceptors, the real-time brightness environment at regular intervals according to the detection frequency to obtain the detected photosensitivity values of the photoreceptors, and then repeating C. The detection frequency may be 5-300 minutes, even shorter interval, such as 2 minutes, 1 minute, even 30 seconds. This frequency can also be designed to be adjusted as needed, such as: if the outdoor condition is a season or day with a sudden change in weather or brightness, the detection frequency in the room is increased, and vice versa, the detection frequency is reduced. It is also possible that when the detection frequency is a certain value, and when it is found that the conversion range of the detection photosensitivity value exceeds a set value, the detection frequency is adjusted faster or adjusted slower.

Figure 2:
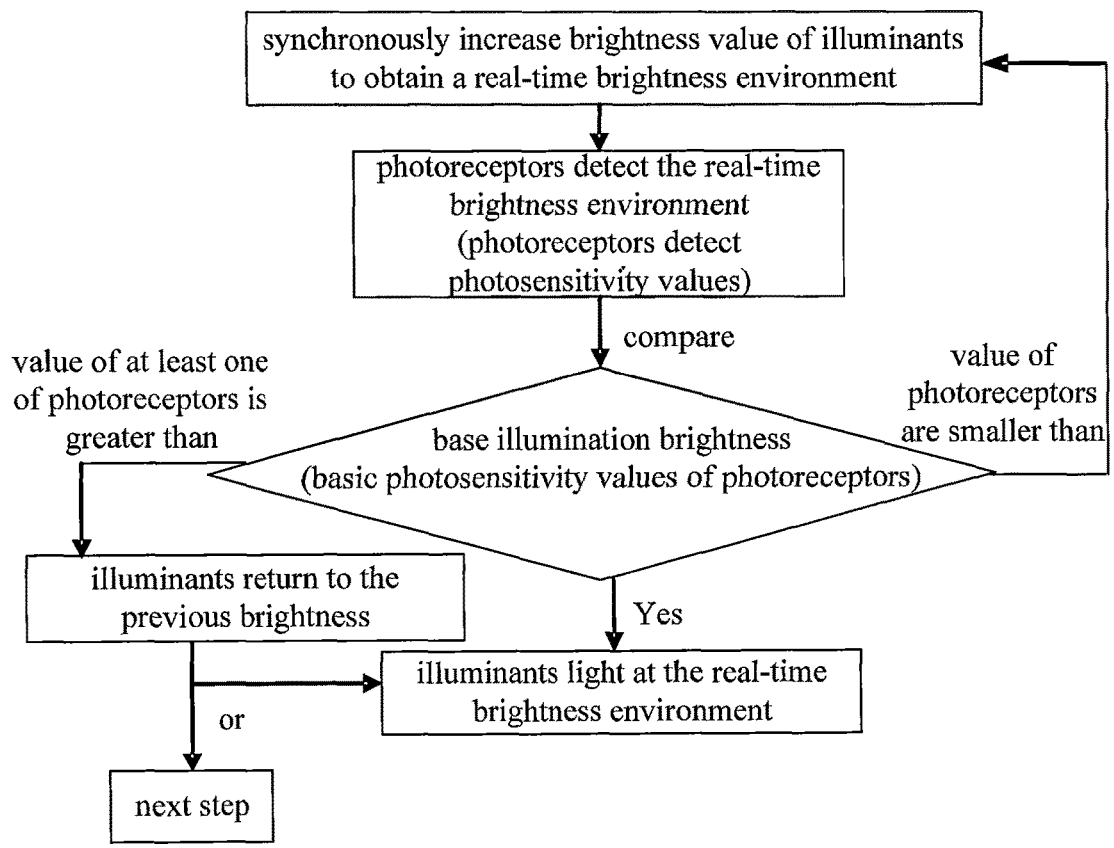
FIG. 2 is a schematic flow chart of increasing the brightness of every illuminant synchronously in B of the present invention.
Figure 3:
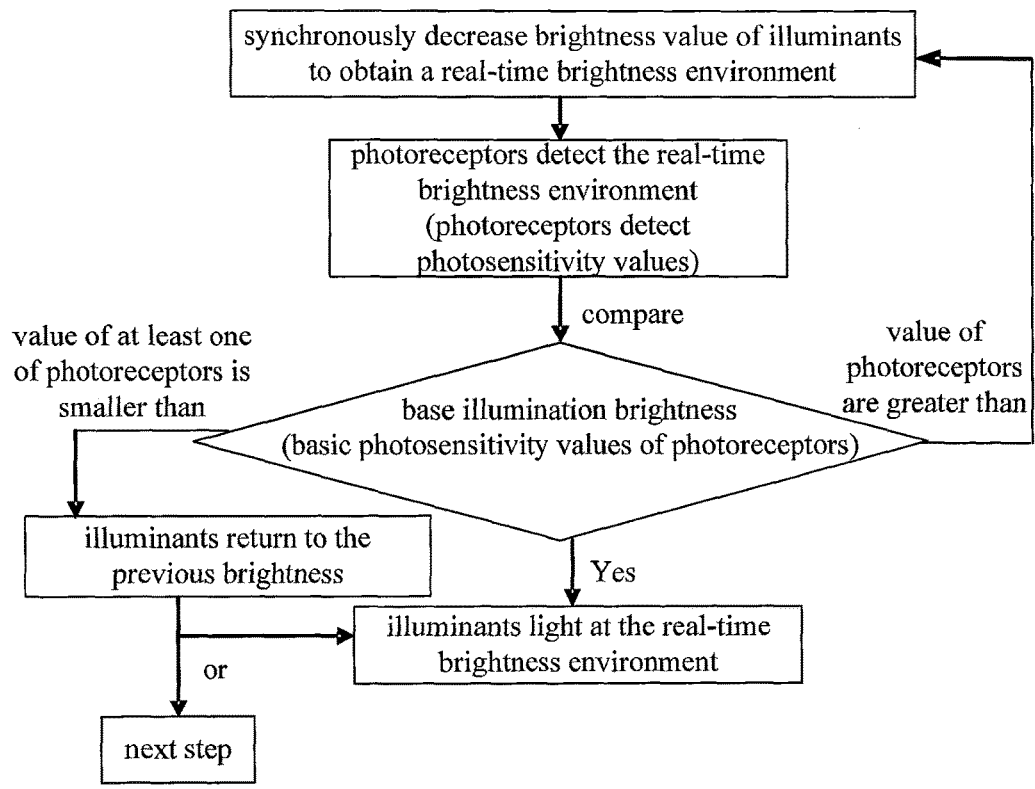
FIG. 3 is a schematic flow chart of decreasing the brightness of every illuminant synchronously in B of the present invention.

The adjusting illumination brightness of illuminants in B means decreasing or increasing the brightness of the individual illuminants synchronously. The steps of this adjustment mode can be seen in FIGS. 2 and 3. FIG. 2 shows a case where each illuminant are synchronously increased by certain brightness value to obtain a real-time brightness environment, and this adjustment mode is usually used in situations where the brightness of the illuminants increases from zero. The brightness value to be increased synchronously is selected according to the brightness of the environment. For example, all illuminants in a lighting space are simultaneously increased to 50% of the maximum illumination brightness, then the photoreceptors detect the real-time brightness environment, and obtain the detected photosensitivity values of each photoreceptors, if the detected photosensitivity values of each photoreceptors are still smaller than the basic illumination brightness (the basic photosensitivity value of each photoreceptor), the brightness of each illuminant is increased synchronously, the second increase in the brightness value is usually different from the first brightness value, such as 20%, or 30%, and so on of the last brightness value. If the value of at least one of the photoreceptors is greater than the basic photosensitivity value of the photoreceptor, the illuminants return to previous brightness. Under the condition that the power saving requirement is not high, each illuminant can be lighting in the real-time illumination brightness environment. Under the condition that the power saving requirement is high, the next step will be performed. In the next step, the illuminants will be increased or decreased by the same or different brightness value, so that the illuminants perform the adjustment of alternately increasing or decreasing the same or different brightness value to achieve higher energy efficiency goals. Under the condition of synchronous adjustment, if the higher energy-saving adjustment is to be carried out, the illuminants should return to the original photosensitivity value even if the photosensitivity values of all the photoreceptors are greater than their basic photosensitivity values or a part of the photosensitivity values reach and the other part of photosensitivity values exceeds the basic photosensitivity value. FIG. 3 shows a situation where the illuminants are synchronously decreased a certain brightness value to obtain a real-time brightness environment. This situation is applicable to the lighting energy saving adjustment mode in which the illuminants are first increased synchronously to the respective maximum brightness value after the start-up, and then decreased synchronously by a certain brightness value. Unlike the case of simultaneously increasing, the synchronously decreasing operation is continued when the photosensitivity values of the photoreceptors are still greater than their basic photosensitivity value; and when the photosensitivity value of the at least one photoreceptor is smaller than its basic photosensitivity value, the illuminants return to the previous brightness. Under the condition that the power saving requirement is not high, each illuminant can be lighting in the real-time illumination brightness environment. The next step is necessary if the further energy saving is required. In the next step, the illuminants will be increased or decreased by the same or different brightness value one by one, so that the illuminants perform the adjustment of alternately increasing or decreasing the same or different brightness value to achieve higher energy efficiency goals. Under the condition of synchronous adjustment, if the higher energy-saving adjustment is to be carried out, the illuminants should return to the original photosensitivity value even if the photosensitivity values of all the photoreceptors are less than their basic photosensitivity values or a part of the photosensitivity values reach and the other part of photosensitivity values exceed their basic photosensitivity values.

The adjusting illumination brightness of illuminants in B means decreasing or increasing the brightness of the individual illuminants. This adjustment consists of two modes. One is as the adjustment mode shown in FIGS. 4 and 5. The illuminants are increased and decreased by a brightness value one by one. The other is the adjustment mode shown in FIG. 6, FIG. 7. A certain illuminant is increased and decreased by a brightness value, and then the other illuminants will be subject to the same process one by one.

Figure 4:
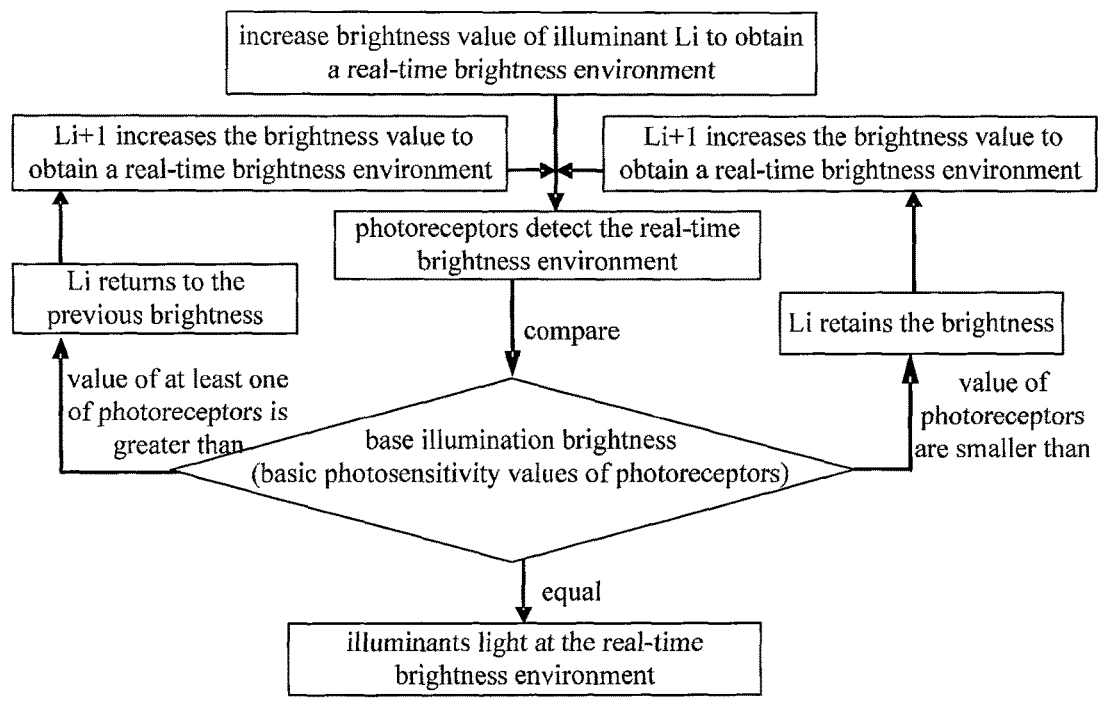
FIG. 4 is a schematic flow chart of increasing the brightness of the illuminants by the same brightness value one by one in B of the present invention.

Specifically, as shown in FIG. 4, the increasing the brightness of the individual illuminants one by one means increasing the brightness of a certain illuminant Li by a certain brightness value when the photosensitivity values detected by the photoreceptors in a certain real-time brightness environment are all less than basic photosensitivity value at the basic illumination brightness, then the photoreceptors detect the real-time brightness environment, then the detection results are compared to the basic photosensitivity values of all photoreceptors, if in step C, the reading numbers of the photoreceptors are still less than the basic photosensitivity values after the brightness of the illuminant is increased by the brightness value, the brightness of the illuminant is retained, and the next illuminant Li+1 will be subject to the process of increasing the brightness value. If the photosensitivity value of at least one of the photoreceptors is greater than the basic photosensitivity value, the illuminant Li returns to the previous brightness and the next illuminant Li+1 will be subject to the process of increasing by the brightness value, and when increasing the brightness of the next illuminant Li+1 by the brightness value, the photoreceptor of which the photosensitivity value has been greater than the basic photosensitivity value will not participate the brightness detection. This is repeated until all illuminants are subjected to the above steps and then the flow proceeds to the next step; if the photosensitivity values of the photoreceptors are all greater than and/or equal to (not less than) the basic photosensitivity values, every illuminants are lighting at the real time brightness environment.

Figure 5:
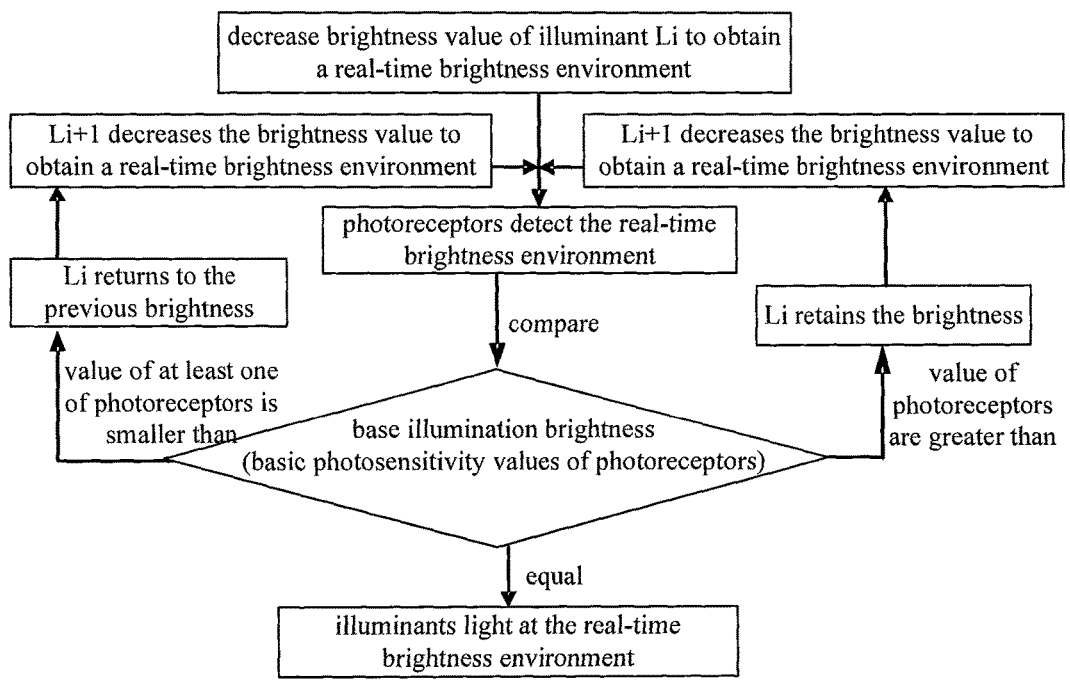
FIG. 5 is a schematic flow chart of decreasing the brightness of the illuminants by the same brightness value one by one in B of the present invention.

As shown in FIG. 5, the decreasing the brightness of the individual illuminants one by one means decreasing the brightness of a certain illuminant Li by a certain brightness value when the photosensitivity values detected by the photoreceptors in a certain real-time brightness environment are all greater than the basic photosensitivity values at the basic illumination brightness. The photoreceptors detect the real-time brightness environment, and then the detection results are compared to the basic photosensitivity values of all the photoreceptors, if in the step C, the reading numbers of the photoreceptors are still greater than the basic photosensitivity values after the brightness of the illuminant is decreased by the brightness value, the brightness of the illuminant is retained, and the next illuminant Li+1 will be subject to the process of decreasing the brightness value. If the photosensitivity value of at least one of the photoreceptors is less than the basic photosensitivity value, the illuminant Li returns to the previous brightness and the next illuminant Li+1 will be subject to the process of decreasing by the brightness value. This is repeated until all the illuminants are adjusted and then the flow proceeds to the next step; if the photosensitivity values of the photoreceptors are equal to the basic photosensitivity values, the illuminants will be lighting at the real-time brightness environment.

Figure 6:
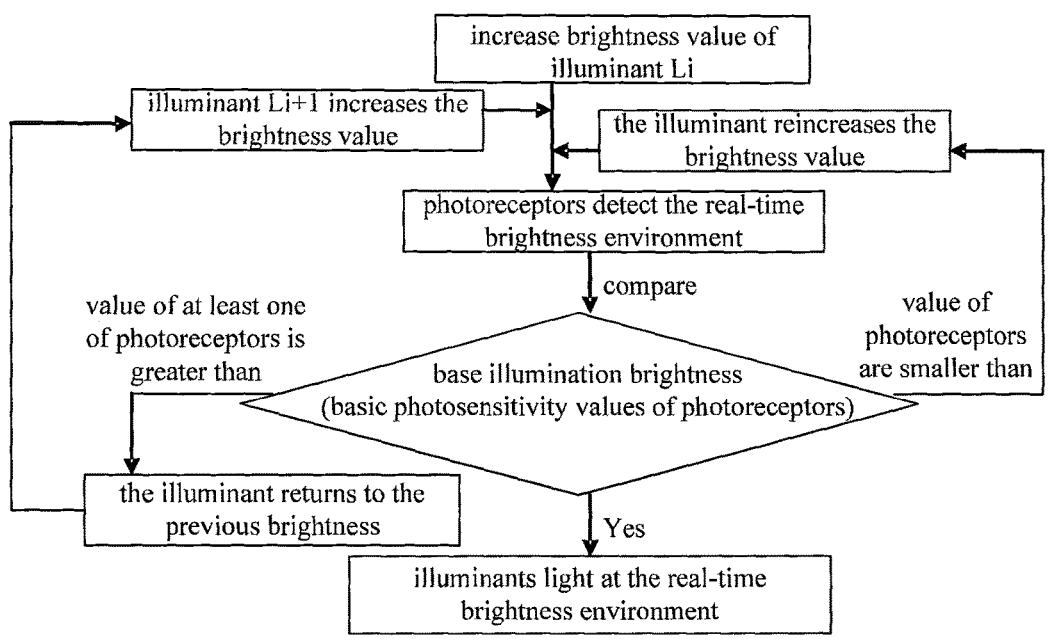
FIG. 6 is a schematic flow chart of increasing the brightness of the illuminants by the different brightness value one by one in B of the present invention.
Figure 7:
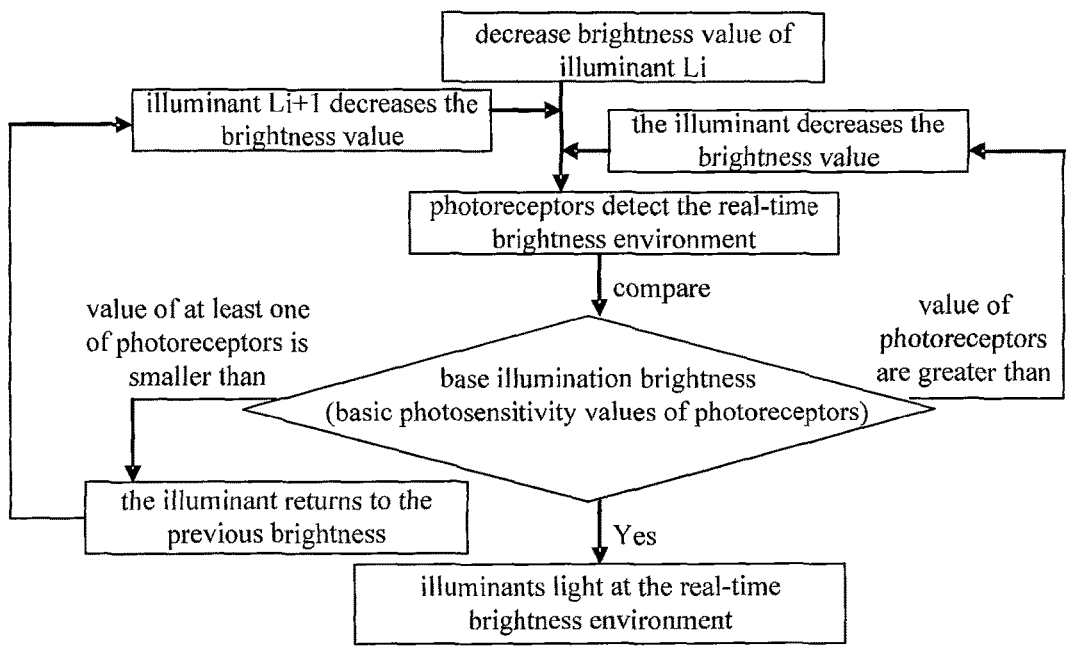
FIG. 7 is a schematic flow chart of decreasing the brightness of the illuminants by the different brightness value one by one in B of the present invention.

In FIG. 6, the increasing the brightness of individual illuminants one by one means B1: increasing the brightness of a certain illuminant Li by brightness values step by step, and returning the illuminant to the brightness which is the previous brightness before the last increasing of the brightness value if the reading number of at least one of the photoreceptors will be greater than the basic photosensitivity value when the brightness of the illuminant is increased by one more basic photosensitivity value, B2: performing the process of step B1 on the next illuminant Li+1 and performing the process on all the illuminants. In FIG. 7, the decreasing the brightness of individual illuminants one by one means B1: decreasing the brightness of a certain illuminant Li by brightness values step by step, and returning the illuminant Li to the brightness which is the previous brightness before the last decreasing of the brightness value, if the reading number of at least one of the photoreceptors will be less than the basic photosensitivity value when the brightness of the illuminant is deceased by one more certain brightness value, B2: performing the process of step B1 on the next illuminant Li+1 and performing the process on all the illuminants, wherein, after that and when performing the process of increasing the brightness by the brightness value on the next illuminant, the photoreceptor of which the photosensitivity value has been greater than the basic photosensitivity value will not participate the brightness detection.

The certain brightness value means a brightness of 0.5 degree or 1 degree or 2 degree, or any other desired degree, or a percentage of total brightness, such as 1%, 5%, and so on.

The synchronously increasing or decreasing means increasing or decreasing one degree number at a time; or increasing one degree number many times, the degree number is 1 degree to 3 degree.

Adjusting the illumination brightness of the illuminants means decreasing or increasing the brightness of the individual illuminants one by one before increasing or decreasing synchronously or without increasing or decreasing synchronously.

The adjusting the lighting brightness of the illuminants in step B further means increasing the brightness of one of any two illuminants and decreasing the brightness of the other of the any two illuminants by the same or different brightness values. The brightness value is 1 degree, 2 degree or 3 degree. This step is preferably carried out after the above step of synchronously increasing or increasing one by one is completed. If the basic illumination brightness is still not satisfied, this adjustment mode could be taken to perform the adjustment, see FIGS. 8 and 9.

Figure 8:
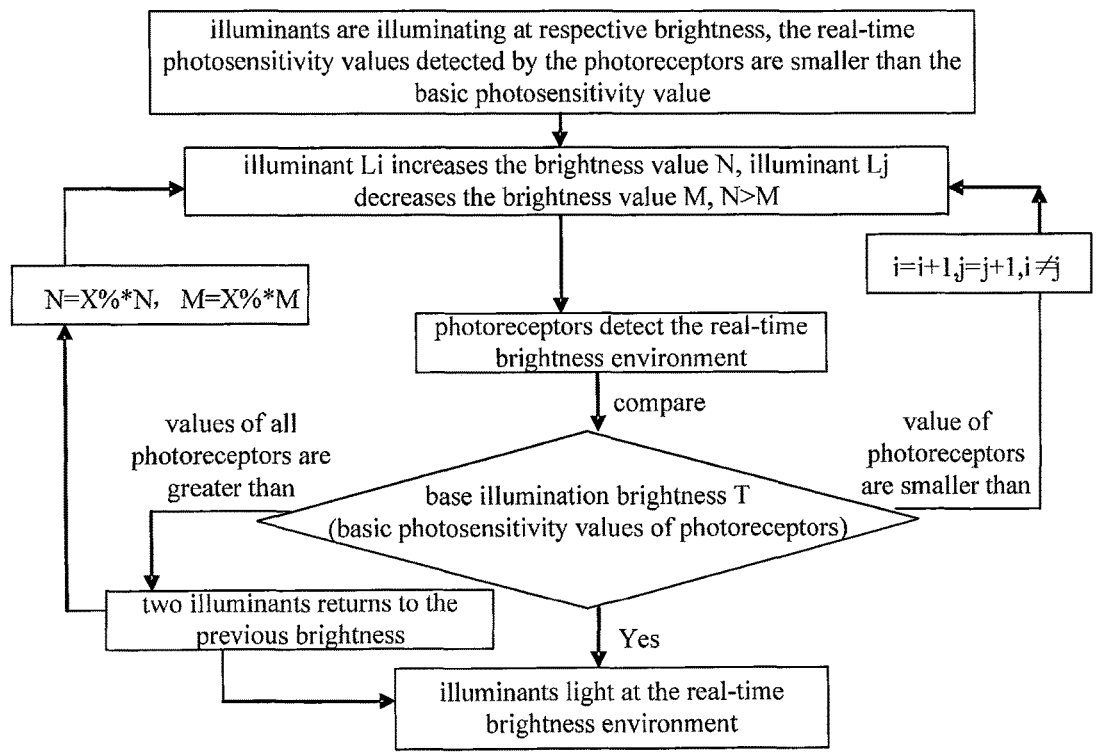
FIGS. 8 and 9 are schematic flow charts of increasing the brightness of one of any two illuminants and decreasing the brightness of the other of the any two illuminants by the different brightness values in B of the present invention.

In FIG. 8, the brightness of the i-th illuminant Li is increased by a brightness value N when the illuminants are illuminating at respective brightness and the real-time photosensitivity values detected by the photoreceptors are smaller than the basic photosensitivity value. N may be, for example, 1 degree, 2 degree, 3 degree or 1%, 0.5% of the total brightness, etc. The brightness of the illuminant Lj is increased by a brightness value M. Wherein i and j are illuminants having the number from 1 to n, i≠j, N>M. N and M may be, for example, 1 degree, 2 degree, 3 degree, or 1%, 0.5% of the total brightness, etc. Then the photoreceptors detect the real-time brightness environment. The detection results are compared to the basic illumination brightness, that is, the detected photosensitivity values detected by the photoreceptors are compared to the basic photosensitivity values of the photoreceptors. If the photosensitivity value of the photoreceptors are still less than the basic photosensitivity value, the next two illuminants Li+1, Lj+1 will be subject to the adjustment of increasing the brightness of one of them and decreasing the brightness of the other. If all the N illuminants have been adjusted, and the photosensitivity value of the photoreceptors are still less than the basic photosensitivity values, the N and M values can be increased or decreased to further adjust. If the reading number of at least one of the photoreceptors is greater than its basic photosensitivity value, the N and M value should be decreased to continue the adjustment of increasing the brightness of one illuminant and decreasing the brightness of the other illuminant. If the photosensitivity values of all the photoreceptors are greater than the basic photosensitivity values, the two illuminants which are the latest ones of the illuminants being adjusted return to the previous brightness. The N and M values are decreased respectively, such as, for example being decreased by the same or different percentage. The brightness of the illuminant Li is increased a new brightness value N, the brightness of the illuminant Lj is decreased a new brightness value M. The illuminants are further subjected to the adjustment of increasing the brightness of one illuminant and decreasing the brightness of the other illuminant, until the detected photosensitivity values detected real-time by the photoreceptors are equal to the basic photosensitivity value of the photoreceptors under a certain accuracy range. The illuminant are lighting in the real-time brightness environment.

Figure 9:
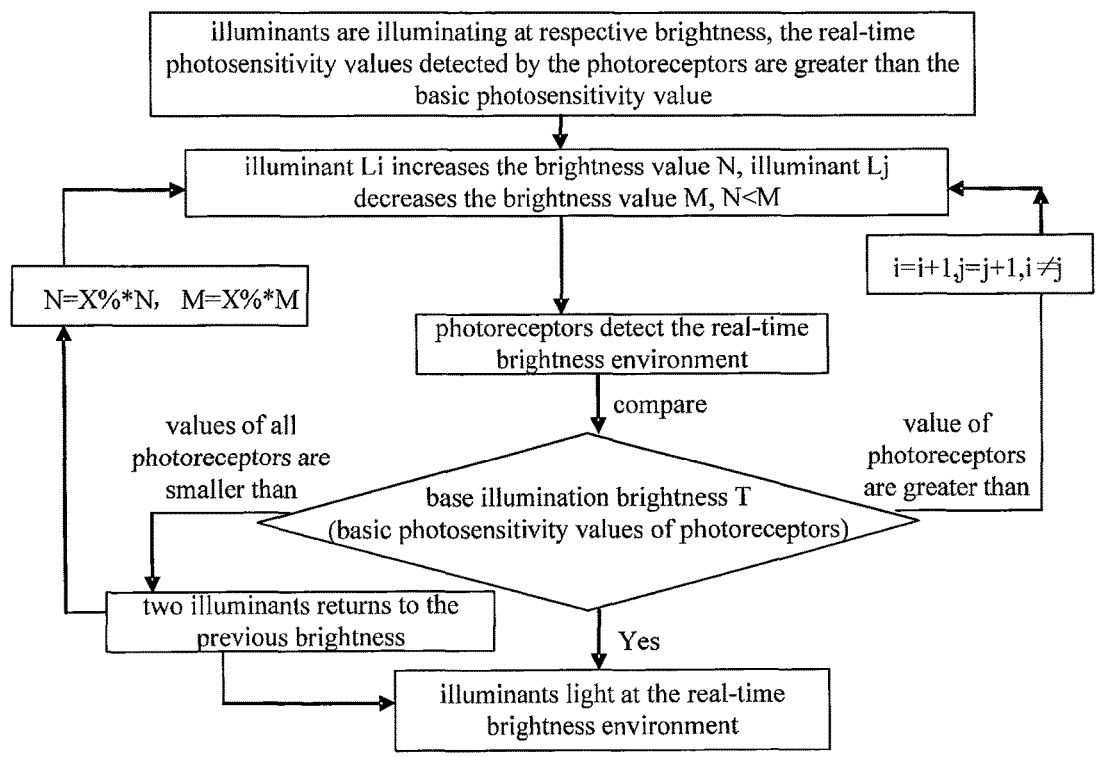

The application condition in FIG. 9 is opposite to those in FIG. 8. That is such a adjustment that, when the photoreceptors are in the respective brightness and the real-time photosensitivity value of the photoreceptors are greater than the basic photosensitivity value, the brightness of one of two illuminants is increased and the brightness of the other of the two illuminants is decreased by a different brightness value, so as to approach the best energy-saving lighting state. Therefore, it is the opposite of the case of FIG. 8 in the adjustment.

The detection frequency is 5-300 minutes. Of course the detection frequency can be more frequent or longer.

The invention claimed is:

1. A lighting energy saving method for energy saving of a lighting system, the lighting system comprises a plurality of brightness adjustable illuminants, and a plurality of photoreceptors for detecting brightness of lighting environment, the brightness of lighting environment is brightness of the environment formed by illumination light emitted from all the illuminants, natural light and illumination light emitted from other lighting systems, wherein comprising: A. setting basic illumination brightness of the lighting environment, i.e. setting basic photosensitivity value of each of the photoreceptors; B. adjusting illumination brightness of each illuminant to a corresponding brightness value to obtain a real-time brightness environment of the lighting environment, and then detecting the real-time brightness environment by the photoreceptors to obtain the photosensitivity values detected by the photoreceptors, the photosensitivity values reflecting the real-time illumination brightness of the real-time brightness environment; C. comparing the detected photosensitivity values actually detected by all the photoreceptors to their own basic photosensitivity values, determining whether their own basic photosensitivity values are satisfied, if not, repeating B, if so, entering D; D. all the illuminants lighting according to the brightness that they should have at the real-time brightness environment;

wherein the adjusting illumination brightness of each illuminant in B means that the illuminants are adjusted synchronously by a certain brightness value until at least one of the photoreceptors satisfies its basic photosensitivity value, and then the adjusting illumination brightness of each illuminant in B further means adjusting the brightness of individual illuminants one by one;

wherein the adjusting the brightness of individual illuminants one by one means increasing or decreasing the brightness of individual illuminants one by one, the increasing means increasing the brightness from low to high, and the decreasing means decreasing the brightness which has been increased in advance to the maximum brightness value;

wherein:
the increasing the brightness of individual illuminants one by one means increasing a certain brightness value of a certain illuminant, wherein, if in C, reading numbers of the photoreceptors are still smaller than the basic photosensitivity values after the brightness of the certain illuminant is increased by the certain brightness value, the brightness of the illuminant is retained, and the next illuminant will be subject to the process of increasing the brightness value; if the photosensitivity value of at least one of the photoreceptors is greater than the basic photosensitivity value, the illuminant returns to the previous brightness and the next illuminant will be subject to the process of increasing brightness, and when increasing the brightness of the next illuminant by the brightness value, the photoreceptor of which the photosensitivity value has been greater than the basic photosensitivity value will not participate the brightness detection; if the photosensitivity values of the photoreceptors satisfy the basic photosensitivity value, the illuminants will be lighting at the real-time brightness environment; the decreasing the brightness of individual illuminants one by one means decreasing a certain brightness value of a certain illuminant, wherein, if in C, the reading numbers of the photoreceptors are still greater than the basic photosensitivity values after the brightness of the certain illuminant is decreased by the certain brightness value, the brightness of the illuminant is retained, and the next illuminant will be subject to the process of decreasing the brightness value; if the photosensitivity value of at least one of the photoreceptors is less than the basic photosensitivity value, the illuminant returns to the previous brightness and the next illuminant will be subject to the process of decreasing brightness, if the photosensitivity values of the photoreceptors are equal to the basic photosensitivity values, the illuminants will be lighting at the real-time brightness environment;

or the increasing the brightness of individual illuminants one by one means B1: increasing the brightness of a certain illuminant by brightness values step by step, and returning the illuminant to the brightness which is the previous brightness before the last increasing of the brightness value if the reading number of at least one of the photoreceptors is greater than the basic photosensitivity value when the brightness of the illuminant is increased by a certain brightness value, B2: performing the process of B1 on the next illuminant and performing the process on all the illuminants, after that and when performing the process of increasing the brightness by the brightness value on the next illuminant, the photoreceptor of which the photosensitivity value has been greater than the basic photosensitivity value will not participate the brightness detection; the decreasing the brightness of individual illuminants one by one means B1: decreasing the brightness of a certain illuminant by brightness values step by step, and returning the illuminant to the brightness which is the previous brightness before the last decreasing of the brightness value, if the reading number of at least one of the photoreceptors will be less than the basic photosensitivity value when the brightness of the illuminant is decreased by a certain brightness value, B2: performing the process of B1 on the next illuminant and performing the process on all the illuminants.

2. The lighting energy saving method according to claim 1, further comprising E: setting a detection frequency, detecting, by the photoreceptors, the real-time brightness environment at regular intervals according to the detection frequency to obtain the detected photosensitivity values of the photoreceptors, and then repeating C.

3. The lighting energy saving method according to claim 2, wherein the detection frequency is 5-300 minutes.

4. The lighting energy saving method according to claim 1, wherein the basic photosensitivity values are satisfied means that the photosensitivity value of a photoreceptor reaches or exceeds its basic photosensitivity value.

5. The lighting energy saving method according to claim 1, wherein if at least one of the photoreceptors satisfies its basic photosensitivity value, the illuminants return to the brightness which is the previous brightness before the last adjustment of the brightness value.

6. The lighting energy saving method according to claim 1, wherein the certain brightness value means a brightness of 0.5 degree or 1 degree or 2 degree, or 1%, 5%, 10% or 20 of the maximum brightness value.

7. The lighting energy saving method according to claim 1, wherein the adjustment synchronously means increasing or decreasing one brightness value at a time; or increasing or decreasing by one brightness value many times, the brightness value is 1 degree to 3 degree, or 1%, 5%, 10% or 20% of the maximum brightness value.

8. The lighting energy saving method according to claim 1, wherein the adjusting the lighting brightness of the illuminants in B further means increasing the brightness of one of random two illuminants and decreasing the brightness of the other of the random two illuminants by the same or different brightness values.

9. The lighting energy saving method according to claim 8, wherein the brightness value is 1 degree, 2 degree or 3 degree, or 1%, 3%, 5% or 10% of the maximum brightness value.

10. The lighting energy saving method according to claim 8, wherein the adjustment of increasing the brightness of one illuminant and decreasing the brightness of the other illuminant is an adjustment that is automatically performed at a set interval.

11. The lighting energy saving method according to claim 1, wherein the adjusting the lighting brightness of the illuminants in B means decreasing or increasing the brightness of the individual illuminants one by one.

* * * * *